(12) United States Patent
Lee et al.

(10) Patent No.: US 8,167,445 B2
(45) Date of Patent: May 1, 2012

(54) BACKLIGHT ASSEMBLY

(75) Inventors: Young-Keun Lee, Cheonan-si (KR);
Gi-Cherl Kim, Youngin-si (KR);
Byung-Choon Yang, Seoul (KR);
Si-Joon Song, Suwon-si (KR);
Young-Min Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 354 days.

(21) Appl. No.: 12/542,923

(22) Filed: Aug. 18, 2009

(65) Prior Publication Data

US 2010/0079977 A1 Apr. 1, 2010

(30) Foreign Application Priority Data

Oct. 1, 2008 (KR) ........................ 10-2008-0096634

(51) Int. Cl.
*G09F 13/04* (2006.01)
*G09F 13/08* (2006.01)

(52) U.S. Cl. ........ 362/97.3; 362/612; 362/633; 362/634
(58) Field of Classification Search ........ 362/97.1–97.4, 362/611–613, 632–634
See application file for complete search history.

(56) References Cited

U.S. PATENT DOCUMENTS

| 2006/0002142 A1* | 1/2006 | Jeong et al. | 362/612 |
| 2006/0087866 A1* | 4/2006 | Ng et al. | 362/612 |
| 2006/0092666 A1* | 5/2006 | Jeong et al. | 362/613 |
| 2006/0187660 A1* | 8/2006 | Liu | 362/294 |
| 2006/0193148 A1* | 8/2006 | Bang | 362/607 |
| 2006/0209564 A1* | 9/2006 | Lin et al. | 362/609 |
| 2009/0141208 A1* | 6/2009 | Byoun et al. | 349/58 |

FOREIGN PATENT DOCUMENTS

| JP | 2007180005 A | 7/2007 |
| KR | 1020060135109 A | 12/2006 |
| KR | 1020070103639 A | 10/2007 |

* cited by examiner

*Primary Examiner* — Anabel Ton
*Assistant Examiner* — Danielle Allen
(74) *Attorney, Agent, or Firm* — Cantor Colburn LLP

(57) ABSTRACT

A backlight assembly includes a light source assembly including a plurality of light source blocks arranged in a first direction, each light source block including a substrate including a reflecting surface and a plurality of point light sources arranged on the substrate, a lower housing accommodating the light source assembly, and a substrate fixing portion disposed at a boundary between adjacent substrates and fixing the light source assembly to the lower housing. The substrate fixing portion includes a head extending overlapping the boundary between the adjacent substrates of the light source blocks and pressing the substrates towards the lower housing, and an engaging protrusion protruding from the head and fixed to the lower housing.

20 Claims, 10 Drawing Sheets

BACKLIGHT ASSEMBLY

This application claims priority to Korean Patent Application No. 10-2008-0096634 filed on Oct. 1, 2008, and all the benefits accruing therefrom under 35 U.S.C. §119, the contents of which are incorporated herein by reference in its entirety.

BACKGROUND OF THE INVENTION

1. Field of the Invention

The present invention relates to a backlight assembly, and more particularly, to a backlight assembly including a substrate fixing portion which fixes a light source assembly including a plurality of light source blocks.

2. Description of the Related Art

One of the most commonly used flat panel displays ("FPDs") is a liquid crystal display ("LCD") which includes two substrates having electrodes formed thereon, and a liquid crystal layer interposed between the two substrates. The LCD displays images by applying a voltage to the electrodes to rearrange liquid crystal molecules of the liquid crystal layer, thereby adjusting the amount of transmission light.

The amount of light passing through the liquid crystal molecules varies depending on the direction and the intensity of an electric field. Therefore, the LCD requires a light source emitting light for image display. The representative examples of the light source used for the LCD include a light emitting diode (hereinafter referred to as "LED"), a cold cathode fluorescent lamp (hereinafter referred to as "CCFL"), and a flat fluorescent lamp (hereinafter, referred to as an "FFL").

The CCFL was used in the conventional liquid crystal display, according to the related art. However, the FFL or the LED has been used to replace the CCFL in conventional liquid crystal displays. Particularly, the LED is used since it has relatively small power consumption and relatively high brightness.

In the liquid crystal display according to the related art, for manufacturing convenience, a plurality of a light source block each having a plurality of LEDs provided on a substrate have been used.

BRIEF SUMMARY OF THE INVENTION

When the liquid crystal display includes a plurality of a light source block each includes a plurality of LEDs provided on a substrate, there may be technical difficulties or disadvantages in manufacturing and/or operating the liquid crystal display. For example, a dark region may be formed due to a very small gap between the substrates of the light source blocks. In addition, the dark region may be formed at boundaries between the substrates of the light source blocks, due to the height difference between the substrates.

An exemplary embodiment of the present invention provides a backlight assembly capable of obtaining substantially uniform brightness from the entire region.

In an exemplary embodiment of the present invention, there is provided a backlight assembly including a light source assembly including a plurality of light source blocks arranged in a first direction, each light source block including a substrate including a reflecting surface and a plurality of point light sources arranged on the substrate, a lower housing accommodating the light source assembly, and a substrate fixing portion disposed at the boundary between adjacent substrates to fix the light source assembly to the lower housing. The substrate fixing portion includes a head extending along the boundary between the adjacent substrates of the light source blocks and presses the substrates towards the lower housing, and an engaging protrusion protruding from the head and fixed to the lower housing.

In an exemplary embodiment of the present invention, there is provided a backlight assembly including a light source assembly including a plurality of light source blocks arranged in a first direction, each light source block including a substrate and a plurality of point light sources arranged on the substrate, a lower housing accommodating the light source assembly, substrate fixing portions disposed at a first boundary between pairs of adjacent substrates to fix the light source assembly to the lower housing, and a reflecting sheet provided on the light source assembly and including a plurality of reflecting blocks corresponding to the light source blocks and a second boundary between pairs of adjacent reflecting blocks. Each of the substrate fixing portions includes a head extending along the first boundary between the substrates of the light source blocks and pressing the substrate, and an engaging protrusion protruding from the head and fixed to the lower housing. The engaging protrusions pass through the respective boundaries between the pairs of adjacent substrates of the light source blocks and the boundaries between the adjacent reflecting blocks.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
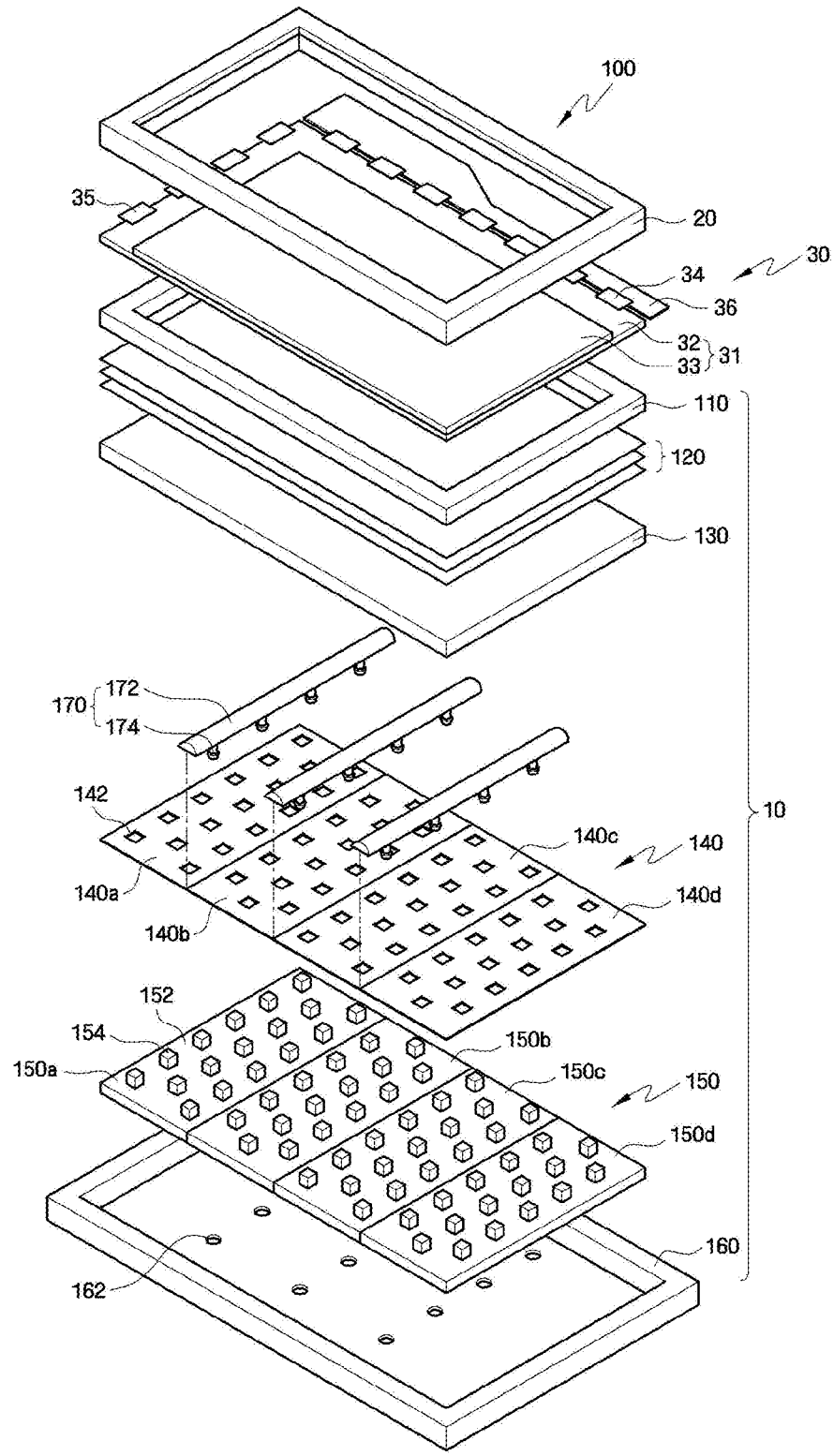
FIG. 1 is an exploded perspective view illustrating a liquid crystal display device according to a first exemplary embodiment of the present invention.

The present invention will now be described more fully with reference to the accompanying drawings, in which exemplary embodiments of the present invention are shown. The present invention may, however, be embodied in many different forms and should not be construed as being limited to the embodiments set forth herein. Rather, these embodiments are provided so that this disclosure will be thorough and complete, and will fully convey the concept of the present invention to those skilled in the art. In the drawings, the size and relative sizes of layers and regions may be exaggerated for clarity.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In the specification, the same components are denoted by the same reference numerals.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, liquid crystal display devices according to exemplary embodiments of the present invention will be described in detail.

Figure 2:
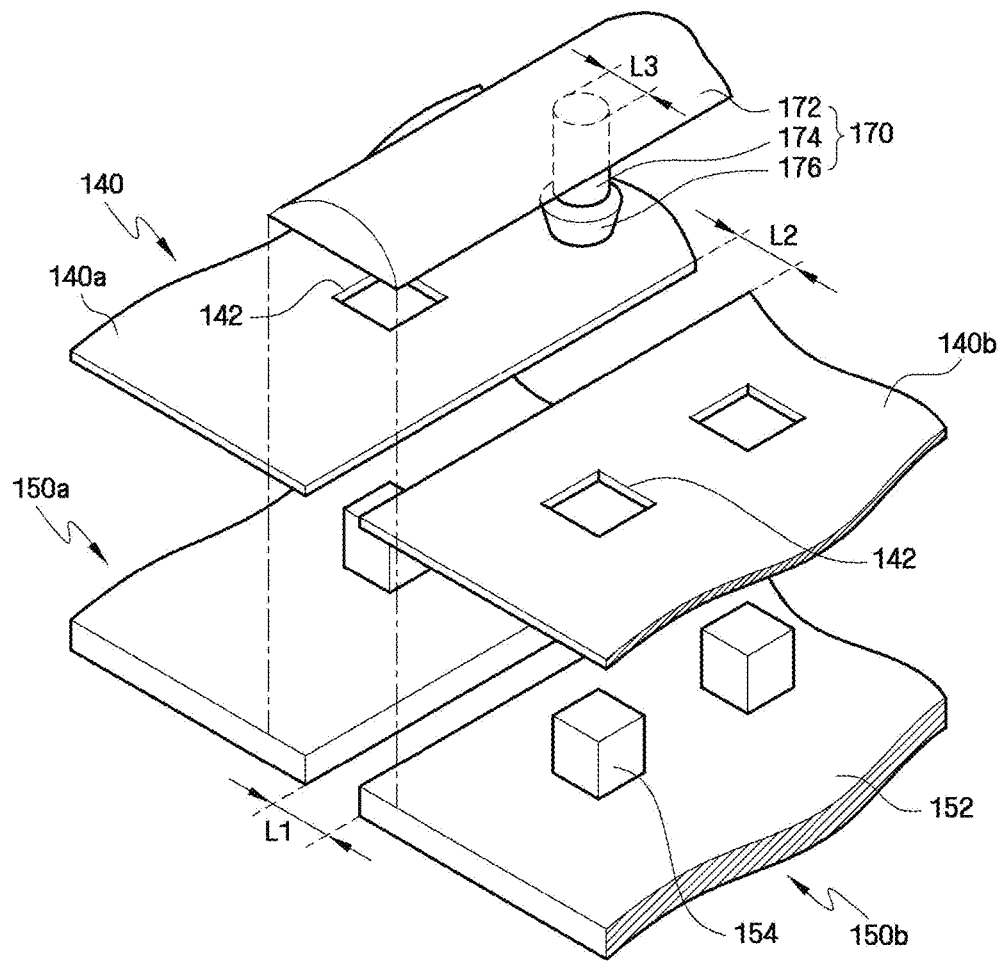
FIG. 2 is an exploded perspective view illustrating an exemplary embodiment of the relationship among a substrate fixing portion, a reflecting sheet, and a light source assembly of the liquid crystal display device shown in FIG. 1.
Figure 3:
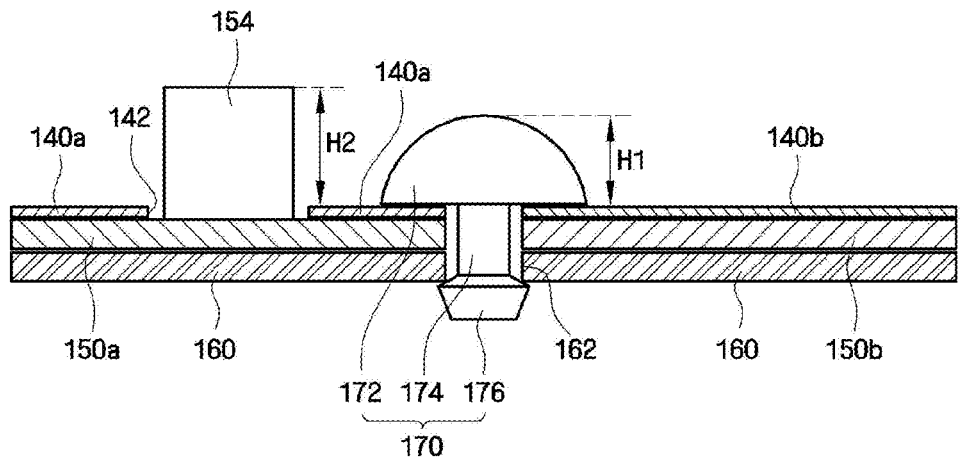
FIG. 3 is a cross-sectional view illustrating the liquid crystal display device shown in FIG. 2.

A liquid crystal display device according to a first exemplary embodiment of the present invention will be described in detail with reference to FIGS. 1 to 3. FIG. 1 is an exploded perspective view illustrating the liquid crystal display device according to the first exemplary embodiment of the present invention. FIG. 2 is an exploded perspective view illustrating the relationship among a substrate fixing portion, a reflecting sheet, and a light source assembly of the liquid crystal display device shown in FIG. 1. FIG. 3 is a cross-sectional view illustrating the liquid crystal display device shown in FIG. 2.

Referring to FIG. 1, a liquid crystal display device 100 according to the first embodiment of the present invention includes a liquid crystal panel assembly 30, an upper housing 20, and a backlight assembly 10.

The liquid crystal panel assembly 30 includes a liquid crystal panel 31 including a lower display panel 32, an upper display panel 33, and a liquid crystal layer (not shown) interposed between the two display panels, a plurality of a gate tape carrier package 35, a plurality of a data tape carrier package 34, and a printed circuit board 36.

The gate tape carrier package 35 is electrically and/or physically connected to gate lines (not shown) disposed on the lower display panel 32, and the data tape carrier package 34 is electrically and/or physically connected to data lines (not shown) disposed on the lower display panel 32.

The printed circuit board 36 may include various driving parts providing gate driving signals to the gate tape carrier package 35, and data driving signals to the data tape carrier package 34.

The backlight assembly 10 includes an intermediate frame 110, a plurality of a planar optical member (e.g., sheets) 120, a planar diffusion member (e.g., plate 130), a planar reflecting member (e.g., sheet) 140, a light source assembly 150, and a lower housing 160.

The light source assembly 150 includes a plurality of a light source block, including first light source block 150*a*, a second light source block 150*b*, a third light source block 150*c*, and a fourth light source block 150*d*. Each of the light source blocks 150*a*, 150*b*, 150*c*, and 150*d* includes a planar base (substrate) 152 and a plurality of a point light source 154 disposed on the substrate 152. The substrate 152 may further include a circuit pattern disposed thereon.

The plurality of the point light source 154 may be spaced apart from each other, as illustrated in FIGS. 1 and 2. In one exemplary embodiment, a light emitting diode ("LED") may be used as the point light source 154.

The overall shape of the liquid crystal display device 100 is substantially a rectangle. In a plan view, when a short side in a transverse direction of the liquid crystal display device 100 is aligned in the vertical direction, and a long side in a longitudinal direction of the liquid crystal display device 100 is aligned in the horizontal direction, the plurality of the light source blocks 150a, 150b, 150c, and 150d may be arranged in the horizontal (longitudinal) direction. The plurality of the light source blocks 150a, 150b, 150c, and 150d is disposed directly adjacent to each other along the longitudinal direction of the liquid crystal display device 100. Each of the plurality of the light source blocks 150a, 150b, 150c, and 150d extends in the transverse direction of the liquid crystal display device 100.

Boundaries between adjacent light source blocks 150a, 150b, 150c, and 150d extend in the vertical (transverse) direction, along a longitudinal direction of the light source blocks 150a, 150b, 150c, and 150d. A substrate fixing portion 170 is provided at each of a respective of the boundaries between the light source blocks 150a, 150b, 150c, and 150d, and fixes the respective light source blocks 150a, 150b, 150c, and 150d to the lower housing 160. As illustrated in FIG. 1, a plurality of the substrate fixing portion 170 is disposed in the liquid crystal device 100. Each of the substrate fixing portions 170 may extend substantially a whole longitudinal length of the light source blocks 150a, 150b, 150c, and 150d.

The substrate fixing portions 170 are provided between the light source blocks 150a, 150b, 150c, and 150d, and reduce or effectively prevent dark regions from being formed at the boundaries between the light source blocks 150a, 150b, 150c, and 150d. In addition, the substrate fixing portions 170 substantially uniformly press the boundaries between the light source blocks 150a, 150b, 150c, and 150d, and fix the light source blocks 150a, 150b, 150c, and 150d. When the substrate fixing portions 170 fix the light source blocks 150a, 150b, 150c, and 150d, separation or deviation of the substrates 152 from each other at the boundaries therebetween is reduced or effectively prevented. The relationship between the substrate fixing portions 170 and the light source assembly 150 will be described below.

The reflecting sheet 140 is disposed directly on the light source assembly 150, and includes a plurality of an opening 142 each corresponding to a point light source 154, through which the point light source 154 of the light source assembly 150 is exposed. Each of the openings 142 is aligned with a point light source 154. When the point light sources 154 are inserted into and exposed through the respective openings 142, light emitted from the point light sources 154 may be reflected from the diffusion plate 130 downward, and portions of the reflecting sheet 140 disposed between and around the openings 142 reflect the light upward. The opening 142 is considered an enclosed opening penetrating the reflecting sheet 140, where no material of the reflecting sheet 140 is disposed. The reflecting sheet 140 solely defines the opening 142.

As illustrated in FIG. 1, the reflecting sheet 140 may be provided as a separate and independent member from the light source assembly 150. Alternatively, the reflecting sheet 140 may be attached, such as by bonding, to the upper surface of the substrates 152 of the light source assembly 150. When the reflecting sheet 140 is attached to the substrate 152, the substrate 152 the itself can serve as the reflective sheet 140, and thereby define a single, continuous and indivisible member of the backlight assembly 10.

The reflecting sheet 140 may be formed as one single, continuous and indivisible sheet overlapping all of the light source blocks 150a, 150b, 150c, and 150d, or the reflecting sheet 140 may be divided into a plurality of a planar reflecting member (e.g., block) including a first reflecting block 140a, a second reflecting block 140b, a third reflecting block 140c, and a fourth reflecting block 140d as illustrated in FIG. 1. Each of the substrate fixing portions 170 may extend substantially a whole longitudinal length of the reflecting blocks 140a, 140b, 140c, and 140d.

In one exemplary, when the number of the reflecting blocks 140a, 140b, 140c, and 140d is equal to the number of light source blocks 150a, 150b, 150c, and 150d, boundaries between the reflecting blocks 140a, 140b, 140c, and 140d may coincide and overlap with the boundaries between the light source blocks 150a, 150b, 150c, and 150d. In an alternative embodiment of the present invention, when the substrate 152 of the light source assembly 150 includes a reflecting surface disposed thereon to form a single continuous and indivisible reflecting member, the separate reflecting sheet 140 may be omitted. Next, for convenience of description, a backlight assembly including the reflecting sheet 140 will be described.

The diffusion plate 130 may be arranged directly on the light source assembly 150 and the reflecting sheet 140, and improves the brightness uniformity of light emitted from the light source assembly 150. Specifically, the diffusion plate 130 reduces or effectively prevents bright spots occurring due to the arrangement of the point light sources 154 viewed from an entire surface of the liquid crystal display device 100.

The optical sheets 120 are provided directly on the diffusion plate 130 opposing the light source assembly 150 with respect to the diffusion plate 130, and diffuse and focus light emitted from the light source assembly 150. In an exemplary embodiment, the optical sheets 120 include a diffusion sheet, a first prism sheet, and/or a second prism sheet.

The diffusion sheet may be provided directly on the light source assembly 150 and improves the brightness of light emitted from the light source assembly 150 and the brightness uniformity thereof. The first prism sheet may be provided directly on the diffusion sheet, and trigonal prism patters (not shown) focusing the light diffused by the diffusion sheet are arranged in a predetermined array on one surface of the first prism sheet. In one exemplary embodiment, a brightness enhancement film may be used as the first prism sheet. The second prism sheet may be a multi-layer reflective polarizing prism sheet provided on the first prism sheet, and focusing and polarizing light. In one exemplary embodiment, a dual brightness enhancement film may be used as the second prism sheet. When only the first prism sheet can ensure sufficient brightness and viewing angle, the second prism sheet may be omitted.

Referring again to FIG. 1, the intermediate frame 110 accommodates the optical sheets 120, the diffusion plate 130, the reflecting sheet 140, and the light source assembly 150, and is mounted and fixed to the lower housing 160. The intermediate frame 110 includes a side wall disposed along a substantially rectangular frame, and an opening window disposed at the center thereof through which light from the diffusion plate 130 and the optical sheets 120 passes towards the LC panel assembly 30. An uppermost side of the liquid crystal display device 100 may hereinafter be referred to as a "viewing side," and a lowermost side of the liquid crystal display device 100 may hereinafter be referred to as a "rear side."

The liquid crystal panel assembly 30 is provided on the optical sheets 120, and is mounted to the inside of the lower housing 160, while simultaneously being supported by the intermediate frame 110. In an exemplary embodiment, a step portion and/or protrusions may be disposed on an inner wall of the intermediate frame 110, to contact and support the liquid crystal panel assembly 30. The lower housing 160 includes a substantially rectangular bottom portion, and a side wall extended from edges of the bottom portion. The bottom portion of the lower housing 160 is a single, continuous and indivisible unit. The lower housing 160 accommodates the optical sheets 120, the diffusion plate 130, the light source assembly 150, the reflecting sheet 140, and the liquid crystal panel assembly 30, such that they are fixed to the inner wall thereof.

A plurality of an engaging hole 162 into which the substrate fixing portions 170 are inserted are disposed in the bottom portion of the lower housing 160. Each of the engaging holes 162 is aligned with a substrate fixing portion 170. The engaging hole 162 is considered an enclosed opening penetrating the bottom portion of the lower housing 160, where no material of the bottom portion of the lower housing 160 is disposed. The bottom portion of the lower housing 160 solely defines the engaging hole 162.

The printed circuit board 36 of the liquid crystal panel assembly 30 may be bent along the outer wall of the lower housing 160, and may be disposed the side wall and/or the rear surface of the lower housing 160 at the rear side of the liquid crystal display device 100. The dimensions and/or shape of the lower housing 160 may vary to provide a structure to accommodate the optical sheets 120, the diffusion plate 130, the light source assembly 150, the reflecting sheet 140, and/or the liquid crystal panel assembly 30 in the lower housing 160.

The upper housing 20 is coupled to the lower housing 160 to cover and overlap an upper surface of the liquid crystal panel assembly 30. An upper surface of the upper housing 20 overlaps edge portions of the liquid crystal panel assembly 30. An opening window through which the liquid crystal panel assembly 30 is exposed to the outside (e.g., the viewing side) is disposed substantially at the center of the upper housing 20.

The upper housing 20 may be coupled to the lower housing 160 by hooks and/or screws, but the coupling method is not limited thereto. Various methods may be used to couple the upper housing 20 and the lower housing 160.

Referring to FIGS. 2 and 3, even though the light source assembly 150 includes a plurality of the light source blocks 150a and 150b, the point light sources 154 may be arranged at predetermined intervals in order to obtain uniform brightness. In one exemplary embodiment, the point light sources 154 may be arranged substantially in a matrix at predetermined intervals in both the horizontal direction and the vertical direction, in a plan view. In another exemplary embodiment, the point light sources 154 may be arranged in a line in the vertical direction and in a zigzag in the horizontal direction. Alternatively, the point light sources 154 may be arranged in a line in the horizontal direction and in a zigzag in the vertical direction. The point light sources 154 in adjacent rows and/or columns may be staggered in position, while within the row or column, be substantially linearly aligned. However, the present invention is not limited thereto. The point light sources 154 may be arranged in various patterns in order to obtain uniform brightness.

The substrate fixing portion 170 includes a top portion (e.g., head) 172 extending along the boundary between adjacent light source blocks, such as the light source blocks 150a and 150b, and/or between adjacent reflecting blocks, such as the reflecting blocks 140a and 140b, and one or more engaging protrusions 174 protruding from the lower surface of the head 172. The head 172 of the substrate fixing portion 170 is a continuous member disposed extended transversely and overlapping a whole of the boundary between adjacent reflecting blocks 140a and 140b, and/or adjacent light source blocks 150a and 150b. The head 172 also overlaps inner edges of the openings 142 and the engaging hole 162 through which the engaging portion 174 is inserted.

It is preferable that the head 172 have a relatively high reflectance, in order to reduce or effectively prevent a dark region from being generated at the boundary between respective reflecting blocks. In one exemplary embodiment, the head 172 may have a reflectance which is equal to or higher than that of the reflecting sheet 140. In the illustrated embodiment, the head 172 has substantially a semicircular shape or a semielliptical shape in a cross-sectional view. With the semicircular shape or a semielliptical shape, the upper surface of the head 172 uniformly reflects light in substantially all directions. The head 172 has a substantially planar (e.g., flat) lower surface opposing the upper curved surface. The flat lower surface of the head 172 uniformly presses the boundary of the reflecting sheet 140 and/or the boundary of the light source assembly 150. According to another embodiment of the present invention, the head 172 may include a transparent material. In this case, the lower surface of the head 172 may be a reflecting surface, or an additional reflecting member may be provided below the head 172.

Referring to FIG. 2, the width (e.g., diameter) of the engaging protrusion 174 is smaller than a width (e.g., diameter) of the head 172. The engaging protrusion 174 is inserted into the corresponding engaging hole 162 of the lower housing 160, and through both the boundary between the reflecting blocks 140a and 140b and the boundary between the light source blocks 150a and 150b. The first light source block 150a is spaced from the second light source block 150b, and the first reflecting block 140a is spaced from the second reflecting block 140b. The engaging protrusion 174 passes through the gap between the first light source block 150a and the second light source block 150b and the gap between the first reflecting block 140a and the second reflecting block 140b.

It is preferable that the width L3 of the engaging protrusion 174 be equal to or smaller than both a distance L1 between the first light source block 150a and the second light source block 150b, and a distance L2 between the first reflecting block 140a and the second reflecting block 140b. The width L3 and the distances L1 and L2 are taken in a transverse direction of the light source blocks 150a and 150b, and the reflecting blocks 140a and 140b. In addition, it is preferable that a width of the head 172 is larger than both the distance L1 and the distance L2, taken in the same transverse direction.

The substrate fixing portion 170 may further include a locking portion 176 having a width which is larger than the width L3 of the engaging protrusion 174, and disposed at a distal end of the engaging protrusion 174, such that the engaging protrusion 174 is fixedly inserted into the engaging hole 162 by the locking portion 176. The locking portion 176 may include a flanged end of the engaging protrusion 174, having a substantially circular profile in a plan view. The maximum width (e.g., diameter) of the locking portion 176 may also be larger than the engaging hole 162 of the lower housing 160, such that when the engaging protrusion 174 is fully inserted into the engaging hole 162, the locking portion 176 restricts movement of the substrate fixing portion 170 in an upward direction away from the lower housing 160.

When the engaging protrusion 174 is fully inserted into the engaging hole 162, the head 172 and the locking portion 176 both overlapping each of the engaging hole 162 of the lower housing 160, edges of the adjacent reflecting blocks 140a and 140b, and edges of the adjacent light source blocks 150a and 150b, solely fix the substrate fixing portion 170 to the lower housing 160. Portions of each of the reflecting sheet 140, the light source assembly 150 and the lower housing 160, are disposed between the head 172 and the locking portion 176 of the substrate fixing portion 170, while the head 172 overlaps an entire of the boundaries between adjacent reflecting blocks and an entire of the boundaries between adjacent light source blocks.

The engaging protrusion 174 may be coupled with the lower housing 160 by inserting the locking portion 176 from an upper surface of the bottom portion of the lower housing 160, such that the locking portion 176 is deformed and the width thereof is reduced when the locking portion 176 travels through the engaging hole 162. When the locking portion 176 reaches the lower surface of the bottom portion of the lower housing 160, the width of the locking portion 176 is restored to being larger than the width of the engaging hole 162.

Referring to FIG. 3, light is emitted from the upper surface of the point light source 154 inserted through the opening 142 and exposed above the upper surface of the reflecting sheet 140. It is preferable that a height of the head 172 be equal to or smaller than a height of the point light source 154, the heights taken in a direction substantially perpendicular to the bottom portion of the lower housing 160. In an exemplary embodiment, the height H1 from the upper surface the reflecting blocks 140a and 140b, to a top of the head 172, is preferably equal to or smaller than the height H2 from the upper surface of the reflecting blocks 140a and 140b to a top (e.g., distal end) of the point light source 154. In addition, the distance from the upper surface of the substrates 152 of the light source blocks 150a and 150b to the top of the head 172, is preferably equal to smaller than the distance from the upper surface of the substrate 152 of the light source assembly 150 to the top of the point light source 154. If the height of the head 172 is larger than that of the point light source 154, light emitted from the point light source 154 is directly incident on the head 172, and uniform brightness is not obtained. In an exemplary embodiment, a height of each of the adjacent substrates is the same, or an upper surface of each of the adjacent substrates is substantially coplanar.

Figure 4:
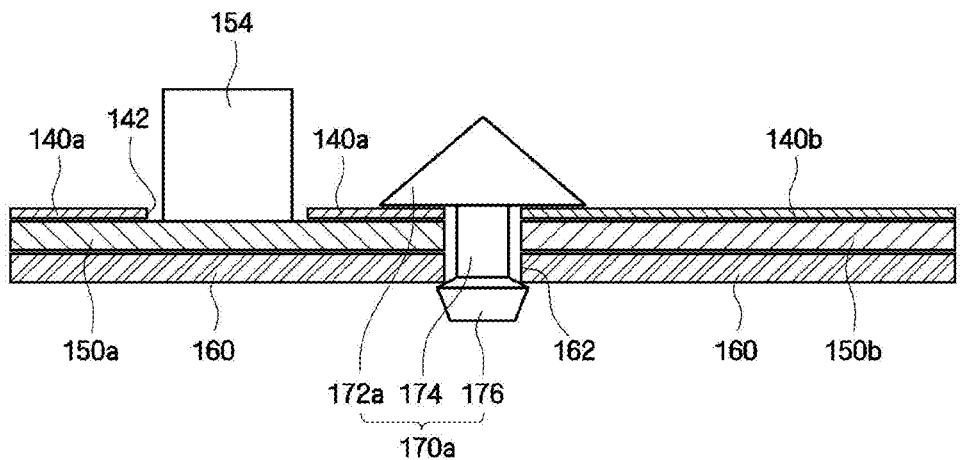
FIGS. 4 to 6 are cross-sectional views illustrating alternative exemplary embodiments of the substrate fixing portion according to the first exemplary embodiment, of the present invention.
Figure 5:
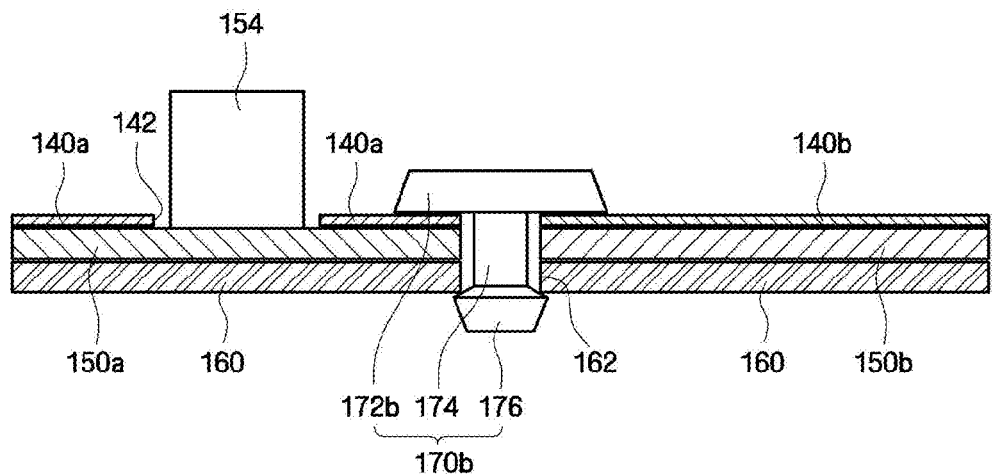
Figure 6:
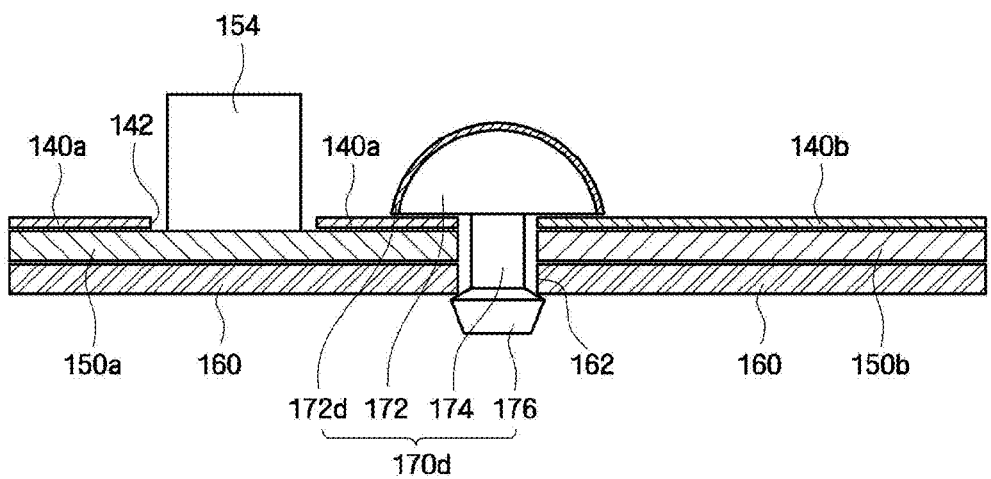

Next, modifications of the substrate fixing portion according to alternative exemplary embodiments of the present invention will be described with reference to FIGS. 4 to 6. FIGS. 4 to 6 are cross-sectional views illustrating alternative exemplary embodiments of the substrate fixing portion according to the present invention.

As shown in FIG. 4, a substrate fixing portion 170a includes a head 172a having a substantially triangular shape in a cross-sectional view, and one or more engaging protrusions 174 protruding from the lower surface of the head 172a. Preferably, the head 172a has an isosceles-triangular shape in a cross-sectional view to obtain constant reflectance in both directions. The head 172a of the substrate fixing portion 170a is a continuous member disposed extended transversely and overlapping a whole of the boundary between adjacent reflecting blocks 140a and 140b, and/or adjacent light source blocks 150a and 150b. The head 172a also overlaps inner edges of the openings 142 and the engaging hole 162 through which the engaging protrusion 174 is inserted.

When the engaging protrusion 174 is fully inserted into the engaging hole 162, the head 172a and the locking portion 176 both overlapping each of the engaging hole 162 of the lower housing 160, edges of the adjacent reflecting blocks 140a and 140b, and edges of the adjacent light source blocks 150a and 150b, solely fix the substrate fixing portion 170a to the lower housing 160. Portions of each of the reflecting sheet 140, the light source assembly 150 and the lower housing 160, are disposed between the head 172a and the locking portion 176 of the substrate fixing portion 170a, while the head 172a overlaps an entire of the boundaries between adjacent reflecting blocks and an entire of the boundaries between adjacent light source blocks.

As shown in FIG. 5, a substrate fixing portion 170b includes a flat head 172b and one or more engaging protrusions 174 which protrude from the lower surface of the head 172b. The head 172b has a rectangular shape in a cross-sectional view, and the upper surface of the head 172b is parallel to the reflecting sheet 140. In this way, the head 172b can have the same function as the reflecting sheet 140 while covering the boundary between the reflecting blocks 140a and 140b. The head 172b of the substrate fixing portion 170b is a continuous member disposed extended transversely and overlapping a whole of the boundary between adjacent reflecting blocks 140a and 140b, and/or adjacent light source blocks 150a and 150b. The head 172b also overlaps inner edges of the openings 142 and the engaging hole 162 through which the engaging protrusion 174 is inserted.

When the engaging protrusion 174 is fully inserted into the engaging hole 162, the head 172b and the locking portion 176 both overlapping each of the engaging hole 162 of the lower housing 160, edges of the adjacent reflecting blocks 140a and 140b, and edges of the adjacent light source blocks 150a and 150b, solely fix the substrate fixing portion 170b to the lower housing 160. Portions of each of the reflecting sheet 140, the light source assembly 150 and the lower housing 160, are disposed between the head 172b and the locking portion 176 of the substrate fixing portion 170b, while the head 172b overlaps an entire of the boundaries between adjacent reflecting blocks and an entire of the boundaries between adjacent light source blocks.

As shown in FIG. 6, a substrate fixing portion 170d includes the head 172, one or more engaging protrusions 174 which protrude from the lower surface of the head 172, and a reflecting film 172d disposed on the upper surface of the head 172. The reflecting film 172d may have a reflectance which is equal to higher than that of the reflecting sheet 140. In this case, the head 172 and the engaging protrusion 174 may include any of a number of materials regardless of reflectance.

When the engaging protrusion 174 is fully inserted into the engaging hole 162, the head 172 and the locking portion 176 both overlapping each of the engaging hole 162 of the lower housing 160, edges of the adjacent reflecting blocks 140a and 140b, and edges of the adjacent light source blocks 150a and 150b, solely fix the substrate fixing portion 170d to the lower housing 160. Portions of each of the reflecting sheet 140, the light source assembly 150 and the lower housing 160, are disposed between the head 172d and the locking portion 176 of the substrate fixing portion 170d, while the head 172d overlaps an entire of the boundaries between adjacent reflecting blocks and an entire of the boundaries between adjacent light source blocks.

Figure 7:
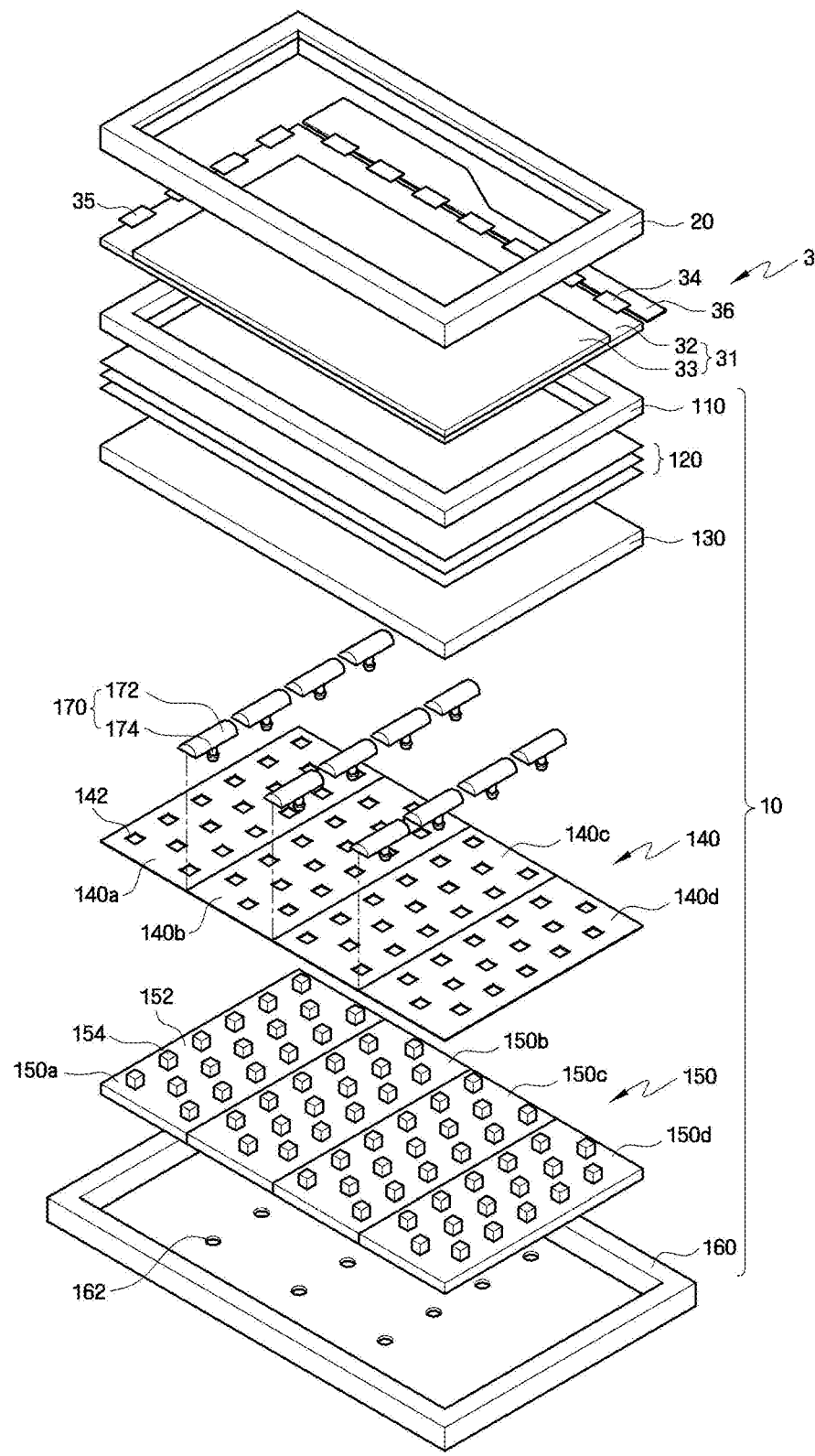
FIG. 7 is an exploded perspective view illustrating a liquid crystal display device according to a second exemplary embodiment of the present invention.

Next, a liquid crystal display device according to a second embodiment of the present invention will be described with reference to FIG. 7. FIG. 7 is an exploded perspective view illustrating the liquid crystal display device according to the second embodiment of the present invention. For convenience of description, in this embodiment, members having the same functions as those in the first embodiment are denoted by the same reference numerals, and a description thereof will be omitted. A description will be focused on only the difference therebetween.

As shown in FIG. 7, a plurality of a substrate fixing portion 170 is provided at predetermined intervals at the boundaries between the light source blocks 150a, 150b, 150c, and 150d. The substrate fixing portions 170 are inserted into the corresponding engaging holes 162 of the lower housing 160 through the boundaries between the reflecting blocks 140a, 140b, 140c, and 140d and the boundaries between the light source blocks 150a, 150b, 150c, and 150d. In the illustrated embodiment, the collection of substrate fixing portions 170 does not form a continuous and indivisible member, such as shown in FIG. 1. The plurality of the substrate fixing portion 170 are arranged along a transverse direction of the liquid crystal display device, and are disposed directly adjacent to each other. End surfaces of adjacent substrate fixing portions 170 may directly contact each other.

While each of the substrate fixing portions 170 in FIG. 7 includes one engaging protrusion 174 disposed on a lower surface thereof, the present invention is not limited thereto. Alternatively, each of the substrate fixing portions 170 may include more than one of the engaging protrusion 174 disposed on the lower surface thereof.

When the engaging protrusion 174 is fully inserted into the engaging hole 162, the head 172 and the locking portion 176 both overlapping each of the engaging hole 162 of the lower housing 160, edges of the adjacent reflecting blocks, and edges of the adjacent light source blocks, solely fix the substrate fixing portion 170 to the lower housing 160. Portions of each of the reflecting sheet 140, the light source assembly 150 and the lower housing 160, are disposed between the head 172 and the locking portion 176 of the substrate fixing portion 170, while the head 172 overlaps an entire of the boundaries between adjacent reflecting blocks and an entire of the boundaries between adjacent light source blocks.

Figure 8:
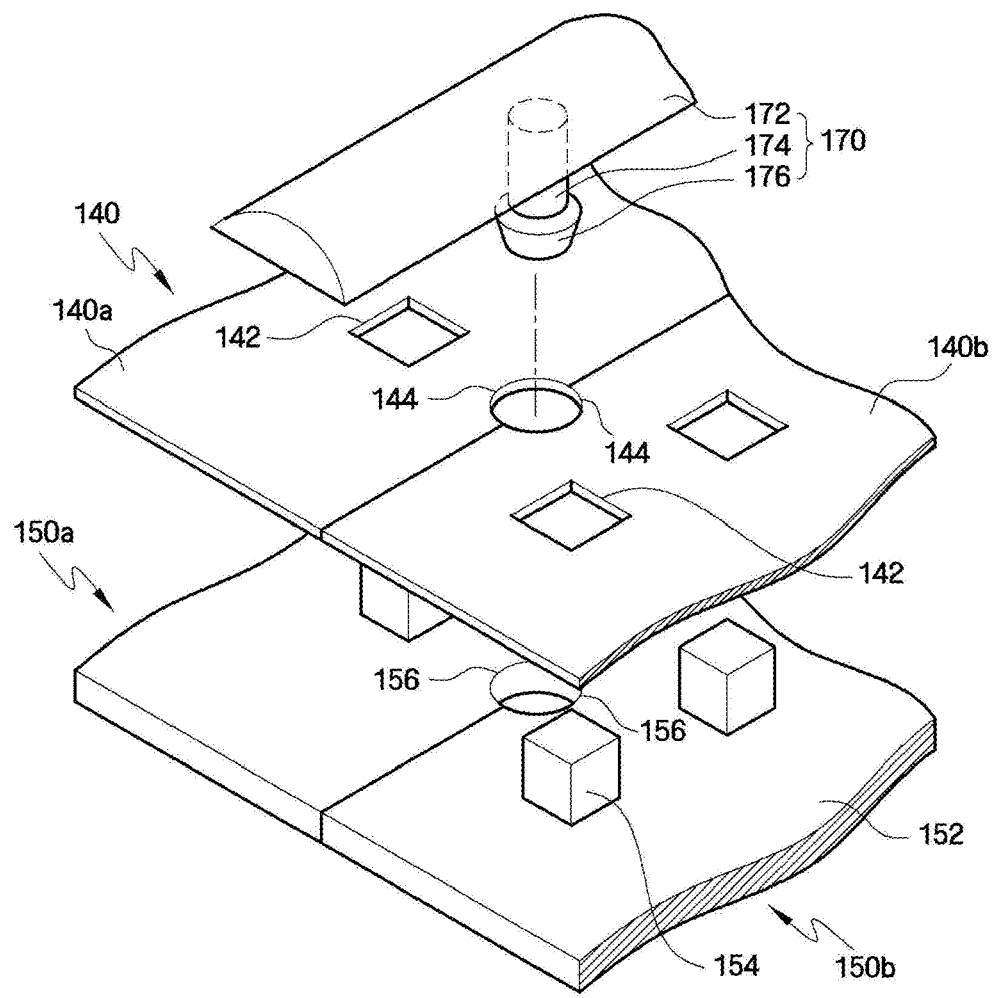
FIG. 8 is an exploded perspective view illustrating the relationship among a substrate fixing portion, a reflecting sheet, and a light source assembly of a liquid crystal display device according to a third exemplary embodiment of the present invention.

Next, a liquid crystal display device according to a third embodiment of the present invention will be described with reference to FIG. 8. FIG. 8 is an exploded perspective view illustrating the relationship among a substrate fixing portion, a reflecting sheet, and a light source assembly of the liquid crystal display device according to the third embodiment of the present invention. For convenience of description, in this embodiment, members having the same functions as those in the first embodiment are denoted by the same reference numerals, and a description thereof will be omitted. A description will be focused on only the difference therebetween.

As shown in FIG. 8, a plurality of a first hole 144 through which an engaging protrusion 174 of the substrate fixing portions 170 passes is disposed at the boundary between the first reflecting block 140a and the second reflecting block 140b. The first reflecting block 140a includes a first hole portion, and the second reflecting block 140b adjacent to first reflecting block 140a includes a second hole portion. The first hole portion and the second hole portion together define the first hole 144.

Boundary edges of the first reflecting block 140a and the second reflecting block 140b include portions where the first and second hole portions are disposed, and a remaining portion which is continuous except for where the first and second hole portions are disposed. The remaining continuous portions of the boundary edges of the first reflecting block 140a and the second reflecting block 140b adjacent to each other, face each other and directly contact each other, as illustrated in FIG. 8.

In addition, a plurality of a second hole 156 through which the engaging protrusion 174 of the substrate fixing portions 170 passes is disposed at the boundary between the first light source block 150a and the second light source block 150b. The engaging protrusions 174 of the substrate fixing portions 170 pass through the first holes 144 and the second holes 156. The first light source block 150a includes a third hole portion, and the second light source block 150b adjacent to first light source block 150a includes a fourth portion. The third hole portion and the fourth hole portion together define the second hole 156.

Boundary edges of the first light source block 150a and the second light source block 150b include portions where the third and fourth hole portions are disposed, and a remaining portion which is continuous except for where the third and fourth hole portions are disposed. The remaining continuous portions of the boundary edges of the first light source block 150a and the second light source block 150b adjacent to each other, face each other and directly contact each other, as illustrated in FIG. 8.

The engaging hole 162 in the lower housing 160 is aligned with both the first hole 144 in the reflecting sheet 140 and the second hole 156 in the light source assembly 150. When the engaging protrusion 174 is fully inserted into the first hole 144, the second hole 156 and the engaging hole 162, the head 172 and the locking portion 176 both overlapping each of the first hole 144, the second hole 156 and the engaging hole 162, solely fix the substrate fixing portion 170 to the lower housing 160. Portions of each of the reflecting sheet 140, the light source assembly 150 and the lower housing 160, are disposed between the head 172 and the locking portion 176 of the substrate fixing portion 170, while the head 172 overlaps an entire of the boundaries between adjacent reflecting blocks and an entire of the boundaries between adjacent light source blocks.

Therefore, even when the first reflecting block 140a contacts the second reflecting block 140b, and the first light source block 150a contacts the second light source block 150b, the substrate fixing portions 170 can be effectively fixed to the lower housing 160 through the reflecting sheet 140 and the light source assembly 150.

Figure 9:
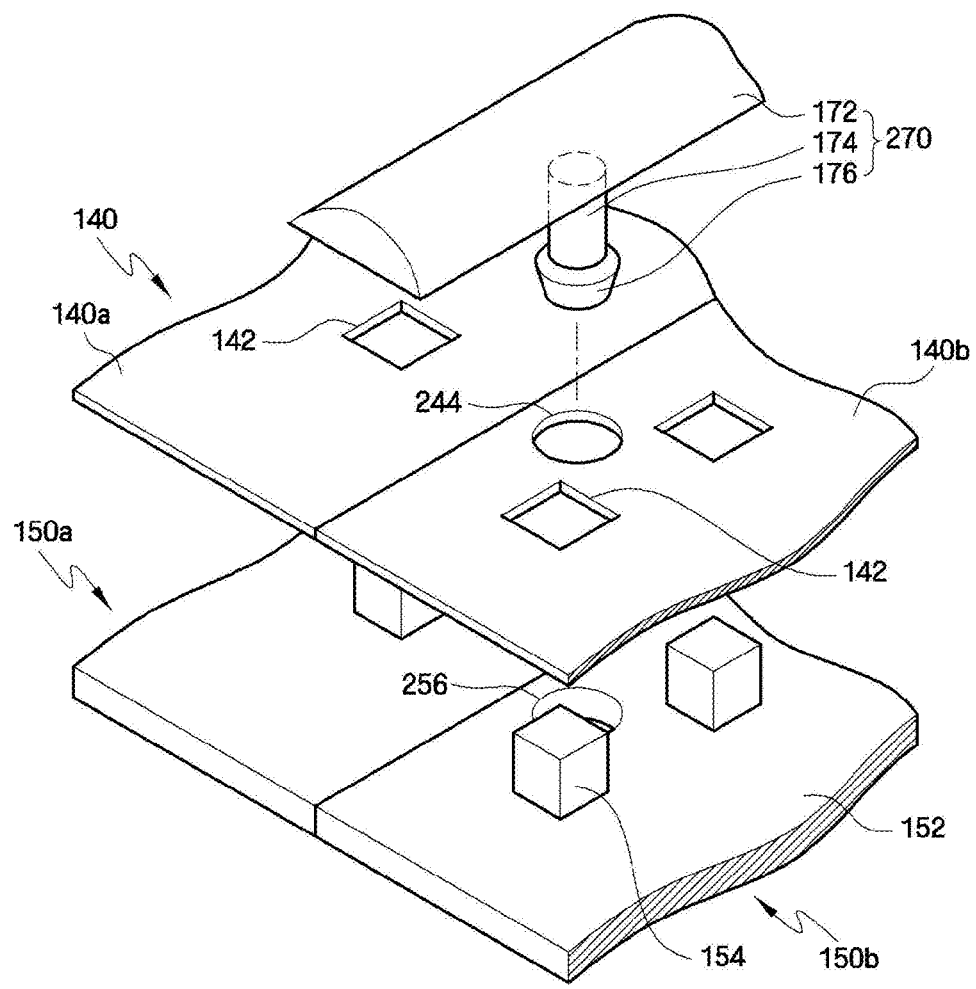
FIG. 9 is an exploded perspective view illustrating the relationship among a substrate fixing portion, a reflecting sheet, and a light source assembly of a liquid crystal display device according to a fourth exemplary embodiment of the present invention.
Figure 10:
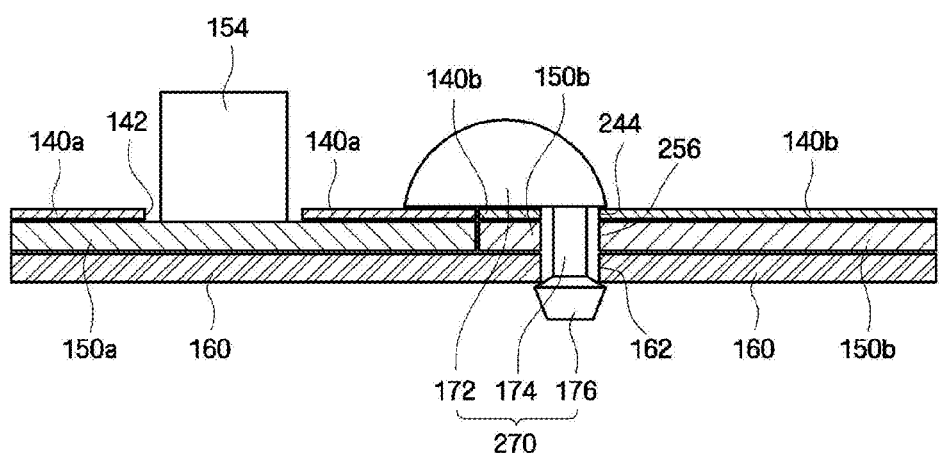
FIG. 10 is a cross-sectional view illustrating the liquid crystal display device shown in FIG. 9.

Next, a liquid crystal display device according to a fourth embodiment of the present invention will be described with reference to FIGS. 9 and 10. FIG. 9 is an exploded perspective view illustrating the relationship among a substrate fixing portion, a reflecting sheet, and a light source assembly of the liquid crystal display device according to the fourth embodiment of the present invention. FIG. 10 is a cross-sectional view illustrating the liquid crystal display device shown in FIG. 9. For convenience of description, in this embodiment, members having the same functions as those in the first embodiment are denoted by the same reference numerals, and a description thereof will be omitted. A description will be focused on only the difference therebetween.

Referring to FIGS. 9 and 10, a substrate fixing portion 270 includes a head 172 overlapping both the boundary between the first reflecting block 140a and the second reflecting block 140b and the boundary between the first light source block 150a and the second light source block 150b, and one or more engaging protrusions 174 which protrude from the lower surface of the head 172. The engaging protrusion 174 may be disposed at a position which deviates from the center of the head 172 to one side, in a transverse direction of the head 172.

In the illustrated embodiment, a first through hole 244 is disposed in a portion of the second reflecting block 140b adjacent to the boundary between the first reflecting block 140a and the second reflecting block 140b. The first through hole 244 is considered an enclosed opening penetrating the second reflecting block 140b, where no material of the second reflecting block 140b is disposed. The second reflecting block 140b solely defines the first through hole 244.

A second through hole 256 is disposed in a portion of the second light source block 150b adjacent to the boundary between the first light source block 150a and the second light source block 150b. The second thorough hole 256 is considered an enclosed opening penetrating the second light source block 150*b*, where no material of the second light source block 150*b* is disposed. The second light source block 150*b* solely defines the second through hole 256.

Alternatively, the first through hole 244 may be disposed in the first reflecting block 140*a*, and the second through hole 256 may be disposed in the first light source block 150*a*. When the through holes are disposed in either of the first or second of adjacent blocks, there may be end block(s) including no through holes, the lower surface of the head 172 contacting and pressing against the upper surface of the end block(s) solely fixes the end block(s) in the liquid crystal display device 100.

Boundary edges of the first reflecting block 140*a* and the second reflecting block 140*b* adjacent to the first reflecting block 140*a*, are each continuous. Boundary edges of the first light source block 150*a* and the second light source block 150*b* adjacent to the first light source block 150*a*, are each continuous. The continuous boundary edges of the first reflecting block 140*a* and the second reflecting block 140*b* adjacent to each other, and the first light source block 150*a* and the second light source block 150*b* adjacent to each other, respectively face each other and directly contact each other, as illustrated in FIGS. 9 and 10.

The engaging protrusion 174 of the substrate fixing portion 270 passes through the first through hole 244 and the second through hole 256. The engaging hole 162 in the lower housing 160 is aligned with both first through hole 244 and the second through hole 256. When the engaging protrusion 174 is fully inserted into the first through hole 244, the second through hole 256 and the engaging hole 162, the head 172 and the locking portion 176 both overlapping each of the first through hole 244, the second through hole 256 and the engaging hole 162, solely fix the substrate fixing portion 170 to the lower housing 160. Portions of each of the reflecting sheet 140, the light source assembly 150 and the lower housing 160, are disposed between the head 172 and the locking portion 176 of the substrate fixing portion 170, while the head 172 overlaps an entire of the boundaries between adjacent reflecting blocks and an entire of the boundaries between adjacent light source blocks.

Therefore, even when the first reflecting block 140*a* contacts the second reflecting block 140*b* and the first light source block 150*a* contacts the second light source block 150*b*, the substrate fixing portions 170 can be effectively fixed to the lower housing 160 through the reflecting sheet 140 and the light source assembly 150.

Figure 11:
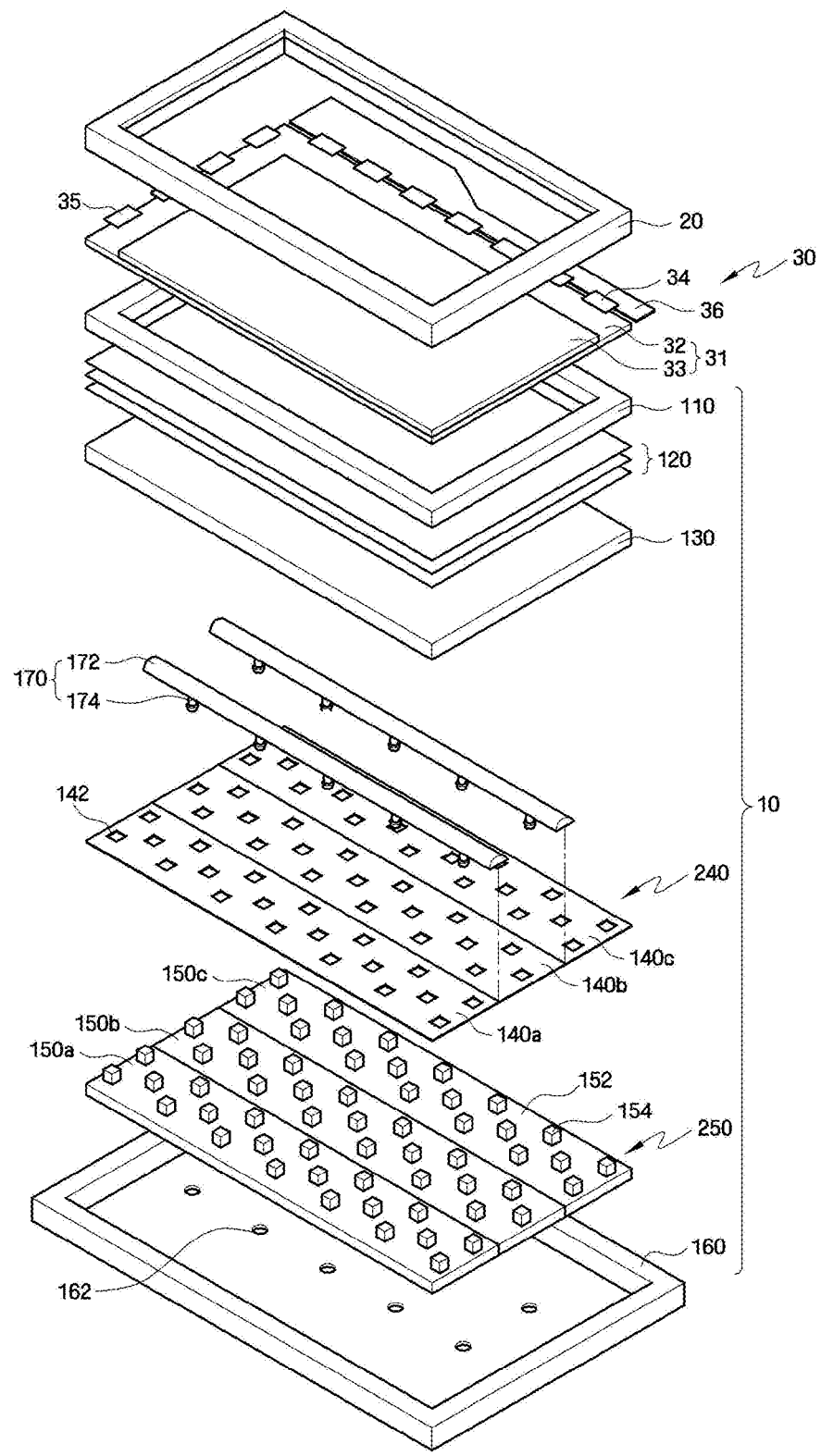
FIG. 11 is an exploded perspective view illustrating a liquid crystal display device according to a fifth exemplary embodiment of the present invention.

Next, a liquid crystal display device according to a fifth embodiment of the present invention will be described with reference to FIG. 11. FIG. 11 is an exploded perspective view illustrating the liquid crystal display device according to the fifth embodiment of the present invention. For convenience of description, in this embodiment, members having the same functions as those in the first embodiment are denoted by the same reference numerals, and a description thereof will be omitted. A description will be focused on only the difference therebetween.

In this embodiment, a plurality of a light source block 150*a*, 150*b*, and 150*c* of a light source assembly 250 is arranged in the vertical direction (e.g., transverse direction of the liquid crystal display device), and the boundaries between the light source blocks 150*a*, 150*b*, and 150*c* each extend in the horizontal direction (e.g., the longitudinal direction of the liquid crystal display device). A plurality of a reflecting block 140*a*, 140*b*, and 140*c* of a reflecting sheet 240 is arranged in the vertical direction, and the boundaries between the reflecting blocks 140*a*, 140*b*, and 140*c* each extend in the horizontal direction.

Substrate fixing portions 170 are provided at the boundaries between the light source blocks 150*a*, 150*b*, and 150*c* and the boundaries between the reflecting blocks 140*a*, 140*b*, and 140*c* to fix the light source blocks 150*a*, 150*b*, and 150*c* and the reflecting blocks 140*a*, 140*b*, and 140*c* to the lower housing 160. Portions of each of the reflecting sheet 140, the light source assembly 150 and the lower housing 160, are disposed between the head 172 and the locking portion 176 of the substrate fixing portion 170, while the head 172 overlaps an entire of the boundaries between adjacent reflecting blocks and an entire of the boundaries between adjacent light source blocks. While a substrate fixing portion 170 similar to that illustrated in FIGS. 1-3 is shown in FIG. 11, any of the substrate fixing portions illustrated in FIGS. 4-10 may be used in the liquid crystal display device of FIG. 11.

Figure 12A:
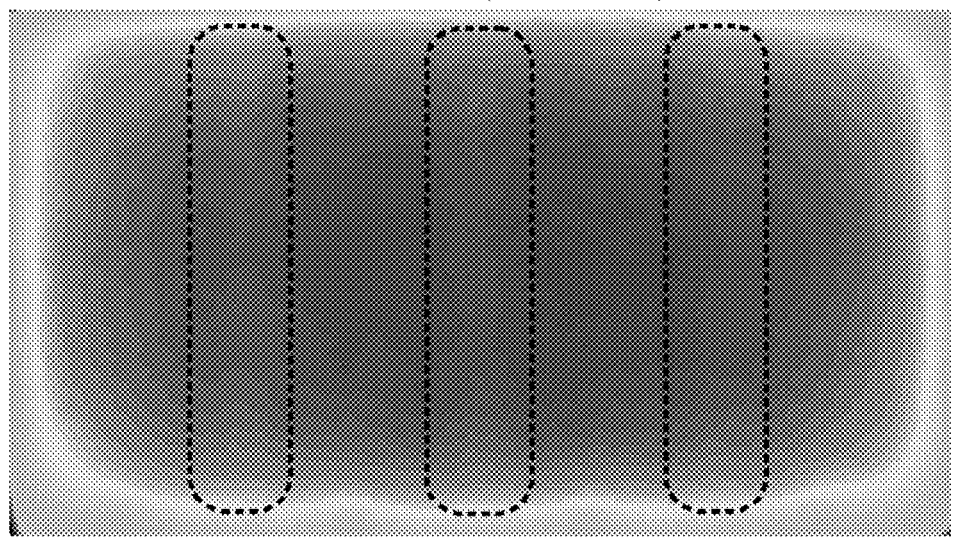
FIG. 12A is an image showing the brightness of a liquid crystal display device, according to the related art.
Figure 12B:
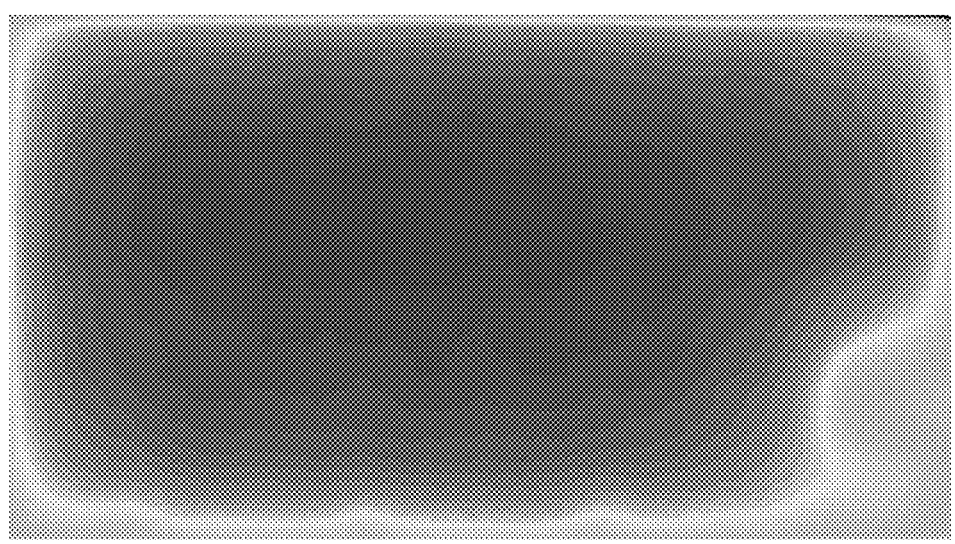
FIG. 12B is an image showing an exemplary embodiment of the brightness of the liquid crystal display devices, according to the embodiments of the present invention.

Next, the brightness uniformity of the liquid crystal display devices according to the above-described embodiments of the present invention will be described with reference to FIGS. 12A and 12B. FIG. 12A is an image showing the brightness of a liquid crystal display device according to the related art, and FIG. 12B is an image showing the brightness of the liquid crystal display device according to any of the above-described embodiments of the present invention. In the images shown in FIGS. 12A and 12B, the same color (e.g., same darkness of the shading) indicates substantially the same brightness.

In the prior art as shown in FIG. 12A, the brightness is lowered at the boundaries between the light source blocks represented by dashed lines, as indicated by the lighter shading. In contrast, as shown in FIG. 12B, the brightness is substantially uniform at the boundaries between the light source blocks. In order to prevent low brightness from being viewed from the boundaries between the light source blocks, it is preferable that the difference between a brightness value in the light source block and a brightness value at the boundary between the light source blocks be less than or equal to 2%. Specifically, in FIG. 12A, the brightness value in the light source block is 5315 nits and the brightness value at the boundary between the light source blocks is 5125 nits. Therefore, the brightness difference is about 3.6%, and bright lines are observed. However, in FIG. 12B, the brightness value in the light source block is 5300 nits and the brightness value at the boundary between the light source blocks is 5250 nits. Therefore, the brightness difference is about 0.95%, and no bright line is observed at the boundaries.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly comprising:
    a light source assembly including a plurality of light source blocks, the plurality of light source blocks includes a substrate and a plurality of point light sources disposed on the substrate;
    a lower housing accommodating the light source assembly; and
    a substrate fixing portion disposed at a boundary between adjacent substrates and fixing the light source assembly to the lower housing, wherein the substrate fixing portion includes:
- a head including a lower surface which faces the substrates and overlaps with the boundary between adjacent substrates of the light source blocks, and restricting movement of the substrates away from the lower housing, and
- an engaging protrusion protruding from the head, contacting the lower surface of the head and fixed to the lower housing.

2. The backlight assembly of claim 1, wherein a height of the head is equal to or smaller than a height of a point light source, the heights taken in a direction substantially perpendicular to the lower housing.

3. The backlight assembly of claim 1, wherein the engaging portion includes a locking portion disposed at an end of the engaging protrusion opposite to the head, and a width of the locking portion is larger than a width of the engaging protrusion.

4. The backlight assembly of claim 3, wherein the head has a semicircular shape, a semielliptical shape, a triangular shape, or a rectangular shape in a cross-sectional view.

5. The backlight assembly of claim 3, wherein the head includes a reflecting film disposed on an upper surface of the head.

6. The backlight assembly of claim 1, further comprising a plurality of heads of the substrate fixing portions arranged at predetermined intervals along a single boundary between a pair of adjacent substrates of the light source blocks.

7. The backlight assembly of claim 1, wherein adjacent light source blocks are arranged spaced apart from each other, and a gap between the adjacent light source blocks is smaller than a width of the head of the substrate fixing portion.

8. The backlight assembly of claim 7, wherein the engaging protrusion of the substrate fixing portion is disposed in the gap between the adjacent light source blocks.

9. The backlight assembly of claim 8, wherein
- a first light source block of the adjacent light source blocks includes a first hole portion disposed at a first substrate boundary edge of the first light source block,
- a second light source block of the adjacent light source blocks includes a second hole portion disposed at a second substrate boundary edge of the second light source block, the first and second substrate boundary edges facing each other,
- the first hole portion and the second hole portion together form a continuous first hole at the boundary between the substrates of the adjacent light source blocks, and
- the engaging protrusion of the substrate fixing portion is inserted through the first hole.

10. The backlight assembly of claim 7, wherein the light source blocks further include a plurality of through holes disposed in interior portions of the light source blocks and adjacent to the boundary between the substrates of the adjacent light source blocks, wherein an engaging protrusion of the substrate fixing portion passes through each of the through holes.

11. The backlight assembly of claim 1, wherein a pair of adjacent substrates arranged at respective sides of the boundary, each have a same height from the lower housing.

12. The backlight assembly of claim 1,
wherein the lower housing includes a plurality of an engaging holes disposed in a bottom portion of the lower housing at positions corresponding to the boundary between the adjacent substrates of the light source blocks, and
wherein an engaging protrusion is inserted into each of the engaging holes, and a portion of the substrate of each of the light source blocks is disposed between the head of the substrate fixing portion and the bottom portion of the lower housing.

13. A backlight assembly comprising:
a light source assembly including a plurality of light source blocks arranged in a first direction, each light source block including:
a substrate; and
a plurality of point light sources disposed on the substrate;
a lower housing accommodating the light source assembly;
a plurality of substrate fixing portions each disposed at a first boundary between adjacent substrates and fixing the light source assembly to the lower housing; and
a reflecting sheet disposed on the light source assembly, the reflecting sheet including a plurality of reflecting blocks each corresponding to a light source block and a second boundary disposed between adjacent reflecting blocks,
wherein each of the substrate fixing portions includes:
- a head extending overlapping both the first boundary between adjacent substrates of the light source blocks and the second boundary between adjacent reflecting blocks, and restricting movement of the substrates and the reflecting blocks away from the lower housing, and
- a plurality of engaging protrusions each protruding from the head towards the lower housing and fixed to the lower housing, each of the engaging protrusions passing through both the first boundary between the adjacent substrates of the light source blocks and the second boundary between the adjacent reflecting blocks.

14. The backlight assembly of claim 13, wherein a height of the head is equal to or smaller than a height of the point light sources.

15. The backlight assembly of claim 14, wherein a reflectance of the head is equal to or higher than a reflectance of the reflecting sheet.

16. The backlight assembly of claim 13, wherein each of the engaging protrusions includes a locking portion disposed at an end of the engaging protrusion opposite to the head, and a width of the locking portion is larger than a width of the engaging protrusion.

17. The backlight assembly of claim 16, wherein the head includes a reflecting film disposed on an upper surface of the head.

18. The backlight assembly of claim 13, wherein
a first light source block of the adjacent light source blocks includes a first hole portion disposed at a first substrate boundary edge of the first light source block,
a second light source block of the adjacent light source blocks includes a second hole portion disposed at a second substrate boundary edge of the second light source block,
the first and second substrate boundary edges facing each other and the first hole portion and the second hole portion together form a plurality of continuous first holes at the first boundary between the substrates of the adjacent light source blocks,
a first reflecting block of the adjacent reflecting blocks includes a third hole portion disposed at a third boundary edge of the first reflecting block,
a second reflecting block of the adjacent reflecting blocks includes a fourth hole portion disposed at a fourth boundary edge of the second reflecting block,
the third and fourth boundary edges facing each other and the third hole portion and the fourth hole portion together form a plurality of continuous second holes at the second boundary between the adjacent reflecting blocks, the first holes and the second holes being aligned with each other, and each of the engaging protrusion of the substrate fixing portion is inserted through an aligned first hole and second hole.

19. The backlight assembly of claim 13, wherein the light source blocks further include a plurality of first through holes disposed in interior portions of the light source blocks and adjacent to the first boundary between the substrates of the adjacent light source blocks, wherein an engaging protrusion passes through the each of the first through holes.

20. The backlight assembly of claim 13, wherein the lower housing includes a plurality of engaging holes disposed in a bottom portion the lower housing at positions corresponding to the first boundary between the light source blocks, and wherein each of the engaging protrusion is inserted into a corresponding engaging hole.

* * * * *